US008647233B2

(12) United States Patent
Hoffman et al.

(10) Patent No.: US 8,647,233 B2
(45) Date of Patent: Feb. 11, 2014

(54) ACCESSORY DRIVE AND ENGINE RESTARTING

(71) Applicant: Ford Global Technologies, LLC, Dearborn, MI (US)

(72) Inventors: Donald E. Hoffman, Canton, MI (US); David A. Janson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/746,021

(22) Filed: Jan. 21, 2013

(65) Prior Publication Data

US 2013/0130850 A1    May 23, 2013

Related U.S. Application Data

(62) Division of application No. 12/840,353, filed on Jul. 21, 2010, now Pat. No. 8,382,631.

(51) Int. Cl.
*F16H 61/664*    (2006.01)
*B60K 6/543*    (2007.10)

(52) U.S. Cl.
USPC .............................. 477/37; 475/214; 180/53.8

(58) Field of Classification Search
USPC ........ 477/57, 3; 475/189, 196, 210, 211, 214, 475/215, 216, 217, 219; 180/53.8, 65.265, 180/65.285
See application file for complete search history.

(56) References Cited

U.S. PATENT DOCUMENTS

| | | | |
|---|---|---|---|
| 3,481,220 A | 12/1969 | Kaptur | |
| RE26,978 E | 11/1970 | Hewko | |
| 5,755,303 A * | 5/1998 | Yamamoto et al. | 180/65.25 |
| 6,659,910 B2 * | 12/2003 | Gu et al. | 477/6 |
| 7,086,981 B2 | 8/2006 | Ali et al. | |
| 7,396,311 B2 | 7/2008 | Ali et al. | |
| 7,497,798 B2 * | 3/2009 | Kim | 475/5 |
| 7,582,034 B2 * | 9/2009 | Usoro | 475/5 |
| 7,637,836 B2 * | 12/2009 | Watanabe et al. | 475/210 |
| 8,292,768 B2 * | 10/2012 | Noboru et al. | 475/5 |
| 8,382,631 B2 * | 2/2013 | Hoffman et al. | 475/214 |
| 8,475,316 B2 * | 7/2013 | Hoffman et al. | 475/210 |
| 2008/0179119 A1 * | 7/2008 | Grenn et al. | 180/65.2 |
| 2009/0312145 A1 | 12/2009 | Pohl et al. | |
| 2010/0140000 A1 * | 6/2010 | Moore | 180/65.245 |
| 2011/0245033 A1 * | 10/2011 | Sato et al. | 477/3 |
| 2012/0028749 A1 * | 2/2012 | Kawasaki et al. | 475/211 |

* cited by examiner

*Primary Examiner* — Roger Pang
(74) *Attorney, Agent, or Firm* — James Dottavio; MacMillan, Sobanski & Todd, LLC

(57) ABSTRACT

A method for controlling a drive system includes driveably connecting an engine to a variator, using a pulley to transmit rotating power from an electric machine through a gearset that increases speed of an input of the variator relative to a speed of the pulley, controlling a speed ratio of the variator, and transmitting power through the gearset and variator to the engine.

19 Claims, 3 Drawing Sheets

| Mixing | Speed |
|---|---|
| 16 | 14 |

| | | |
|---|---|---|
| Sun | 47 | 47 |
| Ring | 73 | 145 |
| Pinion | 12 | 48 |
| Beta | 1.5532 | 3.0851 |

| Mode | Variator Speed Ratio | Ideal Speed Ratios Pulley (20) | Engine (18) | Var. Input (28,29) |
|---|---|---|---|---|
| E.M. Driving | 0.62500 | 1.0000 | 0 | 4.0851 |
| E.M. Driving | 0.43490 | 1.0000 | 0.5000 | 4.0851 |
| E.M. Driving | 0.24479 | 1.0000 | 1.0000 | 4.0851 |
| E.M. Drv. O/D | 0.15625 | 1.0000 | 1.2329 | 4.0851 |
| Engine Driving | 0.35885 | 1.4286 | 1.0000 | 5.8359 |
| Engine Driving | 0.47292 | 2.5000 | 1.0000 | 10.2128 |

Fig. 3

ACCESSORY DRIVE AND ENGINE RESTARTING

This is a divisional application of pending U.S. application Ser. No. 12/840,353, filed Jul. 21, 2010.

BACKGROUND OF THE INVENTION

1. Field of the Invention

This invention relates generally to transmitting rotating power between an electric machine and engine in a motor vehicle, and through a transmission having a stepless speed ratio range.

2. Description of the Prior Art

On vehicles equipped with assisted direct start (ADS), the engine is stopped when the vehicle comes to a stop with the brake pedal depressed and the accelerator pedal released. While the engine is stopped in this way, the electric machine should drive the vehicle accessories and to restart the engine when the driver signals that the vehicle is to move again by releasing the brake pedal and depressing the accelerator pedal. The electric machine replaces the alternator that is conventionally used.

A transmission located in a power path between the electric machine and the engine will allow the engine to remain at zero rotational speed while the electric machine is driving the accessories through the transmission, permit the electric machine to rotate the engine up to start speed when the engine restart is required, and allow the engine to drive the electric machine and accessories under normal driving conditions.

A need exists in the industry for a drive connection between the engine and electric machine, particularly on vehicles equipped with ADS that will provide the desired and necessary functions.

SUMMARY OF THE INVENTION

A method for controlling a drive system includes driveably connecting an engine to a variator, using a pulley to transmit rotating power from an electric machine through a gearset that increases speed of an input of the variator relative to a speed of the pulley, controlling a speed ratio of the variator, and transmitting power through the gearset and variator to the engine.

The pulley is part of a pulley and belt system that provides a driveable connection to an electric machine and other components of the front end accessory drive.

The drive system provides a variable speed drive between the engine and the pulley when the engine is driving the electric machine and the front end accessory drive (FEAD).

The system provides a variable engine to pulley speed ratio from 0.0 to about 1:1, so that the engine can be smoothly restarted by the electric machine by varying the IVT speed ratio while the electric machine continues running.

The engine is driven through a substantial torque multiplication when the IVT speed ratio is about 0.0.

Since no clutches are required, only the variator speed ratio requires control.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 3 is a chart showing the variation of the speed ratios of system components as the variator speed ratio changes.

DESCRIPTION OF THE PREFERRED EMBODIMENT

Figures 1, 2:
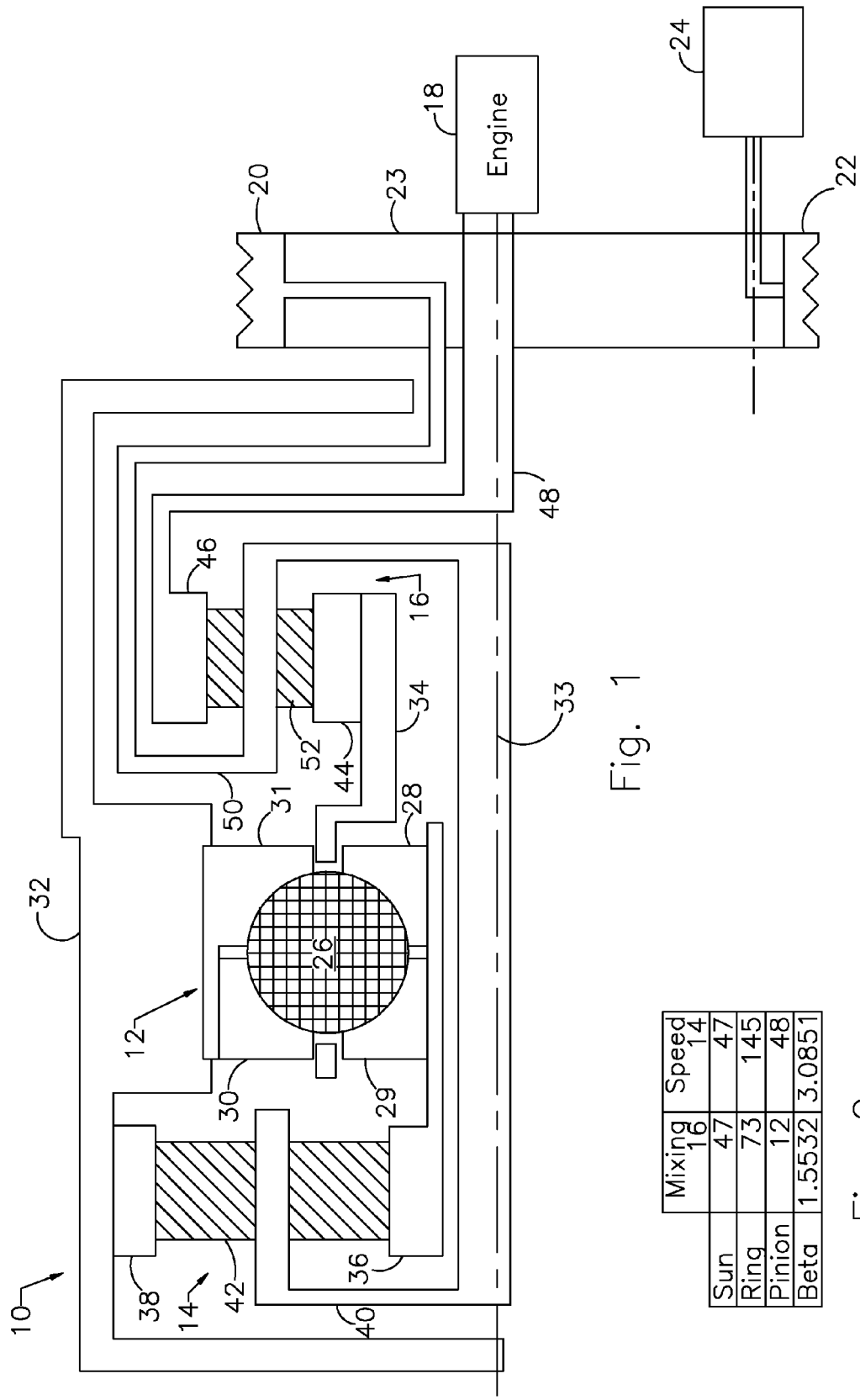
FIG. 1 is a schematic diagram of a drive system for restarting an engine and driving an electric machine at a variable speed ratio.
FIG. 2 is a chart showing the number of teeth on the sun gear, ring gear and planet pinions of the gearsets.

Referring now to the drawings, FIG. 1 illustrates a drive system 10 that includes a Milner ball variator 12, and two planetary gearsets 14, 16. An engine 18 is connected to the gearset 16. A pulley 20 is connected to gearset 16. The Milner ball variator 12, two planetary gearsets 14 and 16, and the pulley 20 are concentric with the engine crankshaft centerline 33. A pulley 22 is driveably connected to an electric machine 24. A drive belt 23 driveably connects pulleys 20 and 22 and other vehicle accessories of the FEAD. The pulleys 20 and 22 and drive belt 23 provide a fixed speed relationship between the electric machine 24 and pulley 20. The electric machine is an electromagnetic device that converts mechanical energy to electrical energy to charge the battery and power the vehicle's electric system when its engine is running. In this mode, it replaces the alternator that is more conventionally used. It also converts electrical energy to mechanical energy to drive the vehicle accessories of the FEAD when the engine is stopped as well as to restart the engine when required.

The Milner ball variator 12 includes spherical balls 26 and is a type of variable geometry, 4-point contact ball bearing. The inner race is divided in two parts 28, 29, and the outer race is divided in two parts 30, 31. By varying the axial distance between the parts of the outer race 30, 31 the distance between the parts of the inner race 28, 29 changes and the balls 26 are displaced radially between the inner and outer races. As the position of the balls change relative to the races, the location of the contact between the balls 26 and the races varies, thereby changing the speed ratio of the variator.

As used in this description, the inner race 28, 29 is the input to the variator 12, the outer race 30, 31 is grounded at 32 against rotation preferably on a case or chassis, and the ball carrier 34, which rotates about axis 33, is the variator output. The output speed of variator 12 is always less than the speed of its input 28, 29.

Planetary speed change gearset 14 includes a sun gear 36, secured to the inner races 28, 29; a grounded ring gear 38, a carrier 40, and a set of planet pinions 42 supported for rotation on the carrier 40 and in meshing engagement with the sun gear 36 and ring gear 38.

Planetary mixing gearset 16 includes a sun gear 44, secured to the ball carrier 34; a ring gear 46, driveably connected to the shaft 48 of the engine 18; a carrier 50; and a set of planet pinions 52 supported for rotation on the carrier 50 and in meshing engagement with the sun gear 44 and ring gear 46. Carriers 40 and 50 are secured mutually and are, driveably connected to pulley 20.

The variator 12 in combination with two planetary gearsets 14, 16 comprise a transmission that produces an infinitely variable speed ratio.

Beta, the ratio of the ring gear pitch diameter and the sun gear pitch diameter of a planetary gearset, is chosen for planetary gearsets 14 and 16 so that, when used with the available speed ratio range of the variator 12, the overall speed ratio of the engine 18 to the pulley 20 can be varied between 0 and 1, or slightly more than 1. FIG. 2 shows the betas of gearsets 14, 16.

The engine 18 can be smoothly restarted by the electric machine 24 by changing the speed ratio of the drive system 10 from 0 to about 1:1, which is accomplished by changing the speed ratio of the variator 12 from 0.625 towards 0.24479. The speed ratio of the variator 12 is defined as the speed of ball carrier 34 divided by the speed of the variator's inner race 28, 29 and sun gear 36. When the engine 18 is driving the electric machine 24, the speed ratio of variator 12 is preferably 0.24479. In this condition, inner race 28, 29 and sun gear 36 rotate 4.0851 times faster than carriers 40, 50 and pulley 20 rotate.

The electric machine 24 can drive the vehicle accessories, such as the air conditioning system compressor and power steering pump, through the FEAD when the engine 18 is stopped. As FIG. 3 shows, when the variator speed ratio is 0.62500 and the electric machine is driven in rotation by the vehicle's battery, engine speed is zero. When axial positions of the inner race 28, 29 and outer race 30, 31 of the variator are controlled such the variator's speed ratio decreases to 0.43490, the engine speed increases to one-half the speed of pulley 20. When the variator's speed ratio decreases to 0.24479, the engine speed is equal to the speed of pulley 20. When the variator speed ratio decreases to 0.15625, the engine is overdriven at a speed that is 1.2329 time the speed of pulley 20.

Also the engine 18 can drive the pulley 20 at a variable speed ratio, from about 1:1 to an overdrive speed at which the pulley 20 rotates faster than engine 18.

As FIG. 3 shows, when the variator speed ratio is 0.35885 and the engine is driving, the pulley 20 is overdriven relative to the engine at a speed that is 1.4286 times engine speed, and the speed of the sun gear 36 and the inner race 28, 29 is 5.8359 times the speed of the engine 18. When the variator speed ratio increases to 0.47292 and the engine is driving, the pulley 20 is overdriven relative to the engine at a speed that is 2.500 times engine speed, and the speed of the sun gear 36 and the inner race 28, 29 is 10.2128 times the speed of engine 18.

Figure 4:
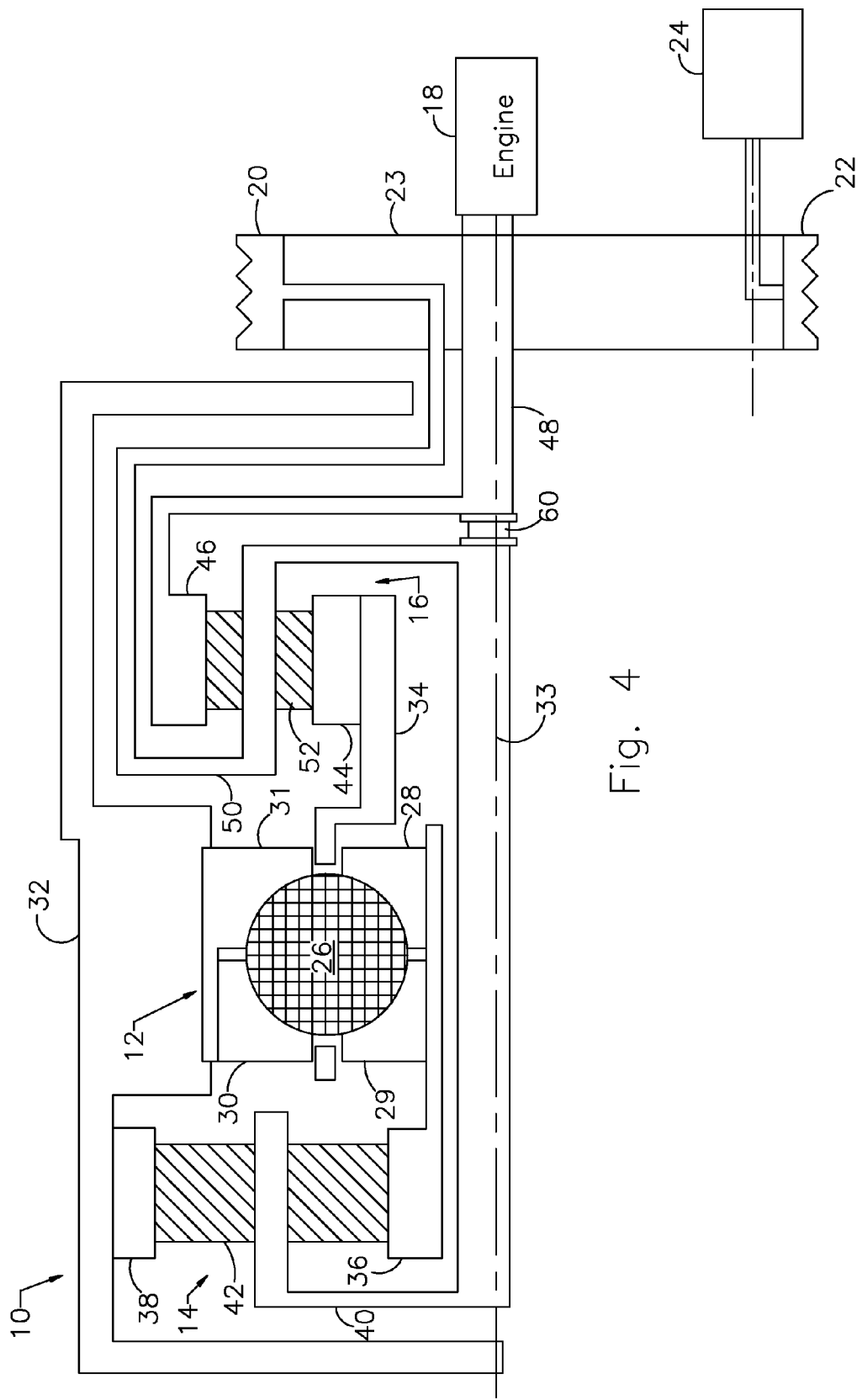
FIG. 4 is a schematic diagram of the drive system of FIG. 1 with a one-way clutch in the system.

FIG. 4 shows the system 10 with a one-way clutch 60 producing a one-way drive connection between the carrier 40 of speed change gearset 14, which is driveably connected to the pulley 20, and the engine shaft 48. In this case, when the engine 18 is running, pulley 20 is driven directly through the one-way clutch 60 at a 1:1 ratio, thereby eliminating variator and gearing efficiency losses when the electric machine only needs to be driven by the engine at engine speed. The pulley 20 could still be overdriven relative to the engine as necessary.

If a one-way clutch 60 is used, the alternate driving O/D operation shown in FIG. 3, in which engine 18 is being driven by the pulley 20 at a speed greater than that of the electric machine is not available, and the variator speed ratio cannot be lower than 0.24479 for the preferred beta ratios of the planetary gearsets 14, 16.

The drive system allows engine 18 to remain at zero speed while electric machine 24 is driving the vehicle accessories, permits the electric machine to drive the engine up to its starting speed when an engine restart is required, and allows the engine to drive both the electric machine and accessories under normal driving conditions.

In accordance with the provisions of the patent statutes, the preferred embodiment has been described. However, it should be noted that the alternate embodiments can be practiced otherwise than as specifically illustrated and described.

The invention claimed is:

1. A method for controlling a drive system, comprising:
    driveably connecting an engine to a variator;
    using a pulley to transmit rotating power from an electric machine through a first gearset that increases speed of an input of the variator relative to a speed of the pulley;
    controlling a speed ratio of the variator;
    transmitting power through the first gearset and variator to the engine.

2. The method of claim 1, further comprising controlling the speed ratio of the variator such that engine speed is zero.

3. The method of claim 1, further comprising increasing engine speed by decreasing the speed ratio of the variator such that engine speed is greater than zero.

4. The method of claim 1, further comprising increasing engine speed by decreasing the speed ratio of the variator such that engine speed is substantially equal to a speed of the pulley.

5. The method of claim 1, further comprising decreasing the speed ratio of the variator such that the engine is driven by the variator at a speed greater than a speed of an output of the variator.

6. The method of claim 5, further comprising:
    discontinuing use of the electric machine to transmit rotating power to the input of the variator;
    using the engine to transmit rotating power through a second gearset, the variator and the first gearset;
    increasing the speed ratio of the variator such that a speed of the pulley is equal to engine speed.

7. The method of claim 6, further comprising increasing the speed ratio of the variator such that the pulley is driven by the variator at a speed greater than engine speed.

8. A method for controlling a drive system, comprising:
    Driveably connecting an engine to a variator;
    using a pulley to transmit rotating power from an electric machine through a first gearset that increases speed of an input of the variator relative to a speed of the pulley;
    driveably connecting the engine through a one-way clutch to the pulley;
    controlling a speed ratio of the variator;
    transmitting power through the gearset and variator to the engine.

9. The method of claim 8, further comprising controlling the speed ratio of the variator such that engine speed is zero.

10. The method of claim 8, further comprising increasing engine speed by decreasing the speed ratio of the variator such that engine speed is greater than zero.

11. The method of claim 8, further comprising increasing engine speed by decreasing the speed ratio of the variator such that engine speed is substantially equal to a speed of the pulley.

12. The method of claim 8, further comprising:
    discontinuing use of the electric machine to transmit rotating power to the input of the variator;
    using the engine to transmit rotating power through the one-way clutch and the pulley to the electric machine.

13. A method for controlling a drive system, comprising:
    driveably connecting an engine to an output of a variator through a second mixing gearset;
    using a pulley to transmit rotating power from an electric machine through a first gearset that increases speed of an input of the variator relative to a speed of the pulley;
    controlling a speed ratio of the variator;
    transmitting power through the first gearset and variator to the engine.

14. The method of claim 13, further comprising controlling the speed ratio of the variator such that engine speed is zero.

15. The method of claim 13, further comprising increasing engine speed by decreasing the speed ratio of the variator such that engine speed is greater than zero.

16. The method of claim 13, further comprising increasing engine speed by decreasing the speed ratio of the variator such that engine speed is substantially equal to a speed of the pulley.

17. The method of claim 13, further comprising decreasing the speed ratio of the variator such that the engine is driven by the variator at a speed greater than a speed of an output of the variator.

18. The method of claim 17, further comprising:
   discontinuing use of the electric machine to transmit rotating power to the input of the variator;
   using the engine to transmit rotating power through the second gearset, the variator and the first gearset;
   increasing the speed ratio of the variator such that a speed of the pulley is equal to engine speed.

19. The method of claim 18, further comprising increasing the speed ratio of the variator such that the pulley is driven by the variator at a speed greater than engine speed.

\* \* \* \* \*